United States Patent [19]

Jennings, Jr. et al.

[11] Patent Number: 4,892,147

[45] Date of Patent: * Jan. 9, 1990

[54] HYDRAULIC FRACTURING UTILIZING A REFRACTORY PROPPANT

[75] Inventors: Alfred R. Jennings, Jr.; Lawrence R. Stowe, both of Plano, Tex.

[73] Assignee: Mobil Oil Corporation, New York, N.Y.

[*] Notice: The portion of the term of this patent subsequent to Jun. 13, 2006 has been disclaimed.

[21] Appl. No.: 138,174

[22] Filed: Dec. 28, 1987

[51] Int. Cl.$^4$ ..................... E21B 43/267; E21B 43/24
[52] U.S. Cl. .................................. 166/280; 166/271; 166/272; 166/302; 166/308
[58] Field of Search ............... 166/280, 303, 302, 272, 166/308, 271, 259; 501/58, 97, 33, 96, 154; 428/402, 404, 406

[56] References Cited

U.S. PATENT DOCUMENTS

| | | | |
|---|---|---|---|
| 3,175,616 | 3/1965 | Huitt et al. | 166/280 |
| 3,399,727 | 9/1968 | Graham et al. | 252/8.551 X |
| 3,400,762 | 9/1968 | Peacock et al. | 166/259 |
| 3,908,762 | 9/1975 | Redford | 166/271 X |
| 4,068,718 | 1/1978 | Cooke, Jr. et al. | 166/280 |
| 4,151,878 | 5/1979 | Thomas | 166/307 |
| 4,547,468 | 10/1985 | Jones et al. | 166/280 X |
| 4,632,876 | 12/1986 | Laird et al. | 166/280 X |
| 4,680,230 | 7/1987 | Gibb et al. | 166/280 X |

*Primary Examiner*—Bruce M. Kisliuk
*Attorney, Agent, or Firm*—Alexander J. McKillop; Charles J. Speciale; Charles A. Malone

[57] ABSTRACT

Silicon carbide is used as a proppant during a hydraulic fracturing process. The proppant is particularly useful when steam-flooding or acidizing a formation. This proppant is crush resistant and impervious to HCl and HCl/HF acids. High formation and reservoir stimulation temperatures do not affect said proppant. Induced fractures are therefore more effectively propped.

13 Claims, No Drawings

HYDRAULIC FRACTURING UTILIZING A REFRACTORY PROPPANT

RELATED APPLICATIONS

This application is related to application Ser. No. 090,062 which was filed on Aug. 24, 1987 now U.S. Pat. No. 4,838,351.

FIELD OF THE INVENTION

This invention relates to a method of fracturing subterranean formations surrounding oil wells, gas wells, and similar boreholes. In one aspect, the invention relates to a method which employs fused refractory proppants for maintaining a fracture in a subterranean formation in a propped condition.

BACKGROUND OF THE INVENTION

Hydraulic fracturing is a well stimulation technique designed to increase the productivity of a well by creating highly conductive fractures or channels in the producing formation surrounding the well. The process normally involves two basic steps: (1) injecting a fluid at sufficient rate and pressure to rupture the formation thereby creating a crack (fracture) in the reservoir rock, and (2) thereafter placing a particulate material (propping agent) in the formation to maintain the fracture walls open by resisting forces tending to close the fracture. If stimulation is to occur, the propping agent must have sufficient mechanical strength to bear the closure stresses and provide relatively high permeability in the propped fracture.

Although a variety of particulate materials are used as proppants, silica sand remains the only material that is used extensively. It has been long recognized, however, that sand is not the ideal proppant. Sand at closure stresses encountered in deep formations tends to disintegrate, producing fines or fragments which can drastically reduce permeability of the propped fracture.

Efforts to develop a proppant capable of bearing high stresses without excessive fragmentation have produced such material as glass beads, steel shot, aluminum pellets, zirconium oxide, sintered bauxite and sintered mullite. Many of the available high strength proppants have not proven satisfactory for deep wells. Multilayers of glass beads, for example, at high stress levels under reservoir conditions do not provide high fracture permeability. Steel shot and aluminum pellets ar susceptible to corrosion by formation brine. Sintered bauxite is susceptible to conversion when treating a formation with HF acid. A sintered bauxite proppant is discussed in U.S. Pat. No. 4,068,718 issued to Cooke et al.

U.S. Pat. No. 3,399,727 discloses the use of propping agent particles composed of ceramics having internal voids. These particles, preferably made by the evolution of gas bubbles within a molten ceramic (e.g. glass, procelain or alumina), are designed to have partial crushability characteristics. According to the patent, the slow settling rate resulting from the low density particles and the partial crushability features make the proppants suitable for partial monolayer propping. However, such particles, because of their cellular structure and partial crushing characteristics, do not have sufficient compressive strength to withstand high stresses encountered in deep well fractures.

Therefore, what is needed is a proppant which can be utilized in hydraulic fracturing which once in place can withstand high stresses encountered in deep wells and acid conditions used in treating a formation.

SUMMARY OF THE INVENTION

This invention relates to a method for hydraulic fracturing a formation where a fused refractory proppant is utilized. Said proppant is placed into a fracturing fluid in an amount sufficient to prop a created fracture. Thereafter, the fracturing fluid with proppant therein is injected into the formation under pressure and conditions sufficient to fracture said formation. Once fracturing has been completed, pressure on the formation is released thereby propping at least one fracture with said proppant.

It is therefore an object of this invention to provide a novel proppant to be used in a fracture to allow for increased heat transfer into a formation when a thermal oil recovery operation is utilized.

It is another object of this invention to provide a novel proppant which is stable in the formation when high temperatures are generated from a formation via a thermal oil recovery method.

It is a further object of this invention to provide for a novel proppant which will prolong the life and effectiveness of a created fracture.

It is yet a further object of this invention to provide for a crush resistant proppant which can be utilized in a steam flood oil recovery method without dissolution of said proppant.

It is another yet further object of this invention to provide for a novel proppant which will remain stable when an acid wash is utilized to remove fines or sand from formation fractures.

DESCRIPTION OF PREFERRED EMBODIMENTS

In the practice of this invention, a viscous fluid, frequently referred to as "pad", is injected into the well at a rate and pressure sufficient to initiate and propagate a fracture in the formation. The earth stresses are such that the fracture normally is along a vertical plane radiating outwardly from the wellbore in opposite directions. The fracturing fluid may be an oil base, water base, acid, emulsion, foam, or any other fluid. Normally, the fluid contains several additives such as viscosity builders, drag reducers, fluid loss additives, corrosion inhibitors, and the like. Injection of the pad is continued until a fracture of sufficient geometry is obtained to permit the entrance of propping agent particles. Normally the treatment is designed to provide a fracture width at the well-bore of at least 2½ times the diameter of the largest propping agent particle. Once the fracture of the desired geometry is obtained, the propping agent suspended in the fluid is deposited in the fracture. The propping agent particles are usually placed in the fracture in a multilayer pattern by maintaining the concentration of the propping agent at from about 0.8 to about 8 pounds per gallon of fracturing fluid. As mentioned previously, the particle size ranges from about 6 to about 100 mesh U.S. sieve, with the 20–40 mesh being the most common. Following the placement of the proppant, the well is shut in for a sufficient time to permit the pressure to bleed off into the formation. This causes the fracture to close and exert a closure stress on the propping agent particles. The shut-in period may vary from a few minutes to several days.

The desired fused refractory material to be utilized herein comprises silicon carbide or silicon nitride. As is preferred, the size of the fused refractory material utilized should be from about 20 to about 100 U.S. Sieve. This fused refractory material should have a Mohs hardness of about 9. Both silicon carbide and silicon nitride have excellent thermal conductivity. Silicon nitride, for example, has a thermal conductivity of about 10.83 BTU/in/sq. ft/hr./° F. at 400 to 2400° F. A suitable silicon carbide material is sold under the trademark Crystolon ® and can be purchased from Norton Company, Metals Divison, Newton, Mass. A suitable silicon nitride material can also be purchased from Norton Company.

This novel proppant is particularly advantageous when a thermal process is utilized during the recovery of hydrocarbonaceous fluids from a formation. One thermal recovery process which can be utilized comprises a steam-flood. A thermal oil recovery process wherein steam is utilized to remove viscous oil from a formation which can be employed herein is described in U.S. Pat. No. 4,598,770. This patent issued to Shu et al. on July 8, 1986 and is hereby incorporated by reference. Another thermal oil recovery method wherein steam is utilized which can be employed herein is described in U.S. Pat. No. 4,593,759. It issued to Penick on June 10, 1986 and is hereby incorporated by reference.

Walton describes yet another thermal oil recovery process which can be used to recover hydrocarbonaceous fluids in U.S. Pat. No. 3,205,944. This patent issued on Sept. 14, 1965 and is hereby incorporated by reference. By this method hydrocarbons within the formation are auto-oxidized. Auto-oxidation occurs at a relatively low rate and the exothermic heat of reaction heats up the formation by a slow release of heat. Since during auto-oxidation, the temperature within the formation can be the ignition temperature of the hydrocarbon material within said formation, the auto-oxidation reaction is controlled to prevent combustion of the hydrocarbonaceous material within the formation.

Heat generated by either of these methods is more effectively transferred into the formation via the fused refractory material used as a proppant herein. Since the fused refractory material used as a proppant herein allows for a more efficient transfer of heat into the formation, smaller volumes of steam can be utilized, for example, in a steam-flood process. Similarly, when using the auto-oxidation method to heat a formation, decreased amounts of oxygen can be used to obtain the same degree of heating within the formation. Once the formation has been heated to the desired degree, increased volumes of hydrocarbonaceous fluids can more effectively be produced to the surface from the formation.

In addition to providing high thermal conductivity, the proppant and fine refractory material used herein can also withstand acids used in treating a well and/or formation, including HCl/HF acid mixtures. The proppant and fine refractory material also provide for high fracture conductivity, acid stability, and high temperature stability when used in formations containing these environments. As will be understood by those skilled in the art, HCl/HF acid mixtures are often used when clearing channels in the formation and hear the well to increase the production of hydrocarbonaceous fluids after sand and clay materials have reduced flow through said channels. Moreover, said proppant is substantially crush resistant having sufficient compressive strength to withstand high stresses encountered in deep well fractures.

The proppant material used herein could also be manufactured in a desired shape to cause it to bridge and remain in place within a created fracture. Using a shape required for a particular fracture would permit the proppant to more effectively prop the formation. It would also allow the proppant to withstand greater formation pressures while in a fracture. It is preferred that the proppant be substantially rounded or spherical in shape.

The refractory proppants utilized herein are particularly beneficial when used in substantially deep wells or wellbores when hydraulically fracturing a formation. By substantially deep wells is meant those wells having a depth in excess of about 7150 feet. At these depths, existing proppants may pose problems. Glass heads for example, have been found to be highly susceptible to brine. Data comparing this susceptibility to sintered bauxite is mentioned by Cooke, Jr. et al. in U.S. Pat. No. 4,068,718 which issued on Jan. 17, 1978. This patent is hereby incorporated by reference.

Although it has been shown that sintered bauxite maintains permeability at stress levels above 5000 psi, dissolution of sintered bauxite, silica and alumina often occurs when high pressure and superheated steam is used during enhanced oil recovery operations. This dissolution occurs in some formations because steam interacts with carbonates so as to form high pH conditions. The refractory proppants used herein overcome this dissolution problem since silicon carbide and silicon nitride are substantially inert materials. They can be utilized in deep wells during a steam flood and maintain their propping effectiveness and the permeability of the created fractures.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A method for hydraulically fracturing a formation where a fused refractory proppant is used comprising:
   (a) placing into a fracturing fluid a fused refractory proppant consisting essentially of silicon carbide or silicon nitride having a Mohs hardness of about 9 and in an amount sufficient to prop a created fracture where said proppant is substantially crush and acid resistant;
   (b) injecting into the formation said fracturing fluid with said proppant therein under a pressure sufficient to fracture said formation; and
   (c) fracturing said formation and thereafter causing said pressure to be released thereby propping at least one fracture which proppant provides for increased heat transfer into said formation.

2. The method as recited in claim 1 wherein said fracturing occurs at depths in excess of about 7150 feet.

3. The method as recited in claim 1 where said proppant is from about 6 to 100 mesh U.S. sieve.

4. The method as recited in claim 1 wherein subsequent to said fracturing hydrochloric or hydrofluoric acid and mixtures therof are utilized to remove fines and or sand from the formation.

5. The method as recited in claim 1 wherein subsequent to said fracturing a steam flood oil recovery process is used to remove hydrocarbonaceous fluids via said fracture.

6. The method as recited in claim 1 wherein said fracturing is conducted within a wellbore located in said formation.

7. The method as recited in claim 1 where increased heat is transferred into said formation during an auto-oxidation method for the recovery of hydrocarbonaceous fluids.

8. A method for hydraulically fracturing a formation where a fused refractory proppant is used comprising:
  (a) placing into a fracturing fluid a fused refractory proppant consisting essentially of silicon carbide or silicon nitride having a Mohs hardness of about 9 and in an amount sufficient to prop a created fracture where said proppant is substantially crush and acid resistant;
  (b) injecting into the formation said fracturing fluid with said proppant therein under a pressure sufficient to fracture said formation;
  (c) fracturing said formation and thereafter causing said pressure to be released thereby propping at least one fracture; and
  (d) initiating a steam flood in said formation whereby said proppant substantially maintains the fracture integrity by avoiding the dissolution effects of the steam flood while providing for increased heat transfer into said formation.

9. The method as recited in claim 8 wherein said fracturing occurs at depth in excess of about 7150 feet.

10. The method as recited in claim 8 where said proppant is of a mesh of from about 6 to 100 U.S. sieve.

11. The method as recited in claim 8 wherein subsequent to said fracturing hydrochloric or hydrofluoric acid and mixtures thereof are utilized to remove fines and or sand from the formation.

12. The method as recited in claim 8 wherein said fracturing is conducted within a wellbore located in said formation.

13. The method as recited in claim 8 where increased heat is transferred into said formation during an auto-oxidation method for the recovery of hydrocarbonaceous fluids.

* * * * *